(12) United States Patent
Das et al.

(10) Patent No.: US 9,713,018 B2
(45) Date of Patent: Jul. 18, 2017

(54) LTE CELL SEARCH AND BLUETOOTH ESCO COEXISTENCE USING SHARED ANTENNA

(71) Applicant: QUALCOMM Incorporated, San Diego, CA (US)

(72) Inventors: Soumya Das, San Diego, CA (US); Nitinkumar Barot, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 14/522,899

(22) Filed: Oct. 24, 2014

(65) Prior Publication Data
US 2016/0119797 A1 Apr. 28, 2016

(51) Int. Cl.
| | | |
|---|---|---|
| *H04W 24/02* | (2009.01) | |
| *H04W 24/08* | (2009.01) | |
| *H04W 48/16* | (2009.01) | |
| *H04W 88/06* | (2009.01) | |
| *H04W 4/00* | (2009.01) | |

(52) U.S. Cl.
CPC .......... *H04W 24/02* (2013.01); *H04W 4/008* (2013.01); *H04W 24/08* (2013.01); *H04W 48/16* (2013.01); *H04W 88/06* (2013.01)

(58) Field of Classification Search
CPC ...................................................... H04W 36/06
USPC ........................................................ 370/252
See application file for complete search history.

(56) References Cited

U.S. PATENT DOCUMENTS

| | | | |
|---|---|---|---|
| 7,873,385 B2 | 1/2011 | Boireau et al. | |
| 8,554,251 B2 | 10/2013 | Bhattacharjee et al. | |
| 2003/0108010 A1* | 6/2003 | Kim ................. | H04L 1/0006 370/333 |
| 2004/0233869 A1* | 11/2004 | Uchida ............. | H04W 28/22 370/329 |
| 2005/0286466 A1* | 12/2005 | Tagg ................ | H04L 12/2856 370/329 |
| 2008/0075033 A1* | 3/2008 | Shattil ............. | H04B 7/026 370/328 |
| 2008/0279163 A1* | 11/2008 | Desai ............... | H04W 52/267 370/338 |
| 2012/0033645 A1 | 2/2012 | Mantravadi et al. | |
| 2012/0213116 A1 | 8/2012 | Koo et al. | |
| 2012/0243473 A1 | 9/2012 | Kadous et al. | |
| 2012/0314598 A1 | 12/2012 | Sadek et al. | |

(Continued)

FOREIGN PATENT DOCUMENTS

WO    WO-2012177938 A1    12/2012

OTHER PUBLICATIONS

ISA/EPO, International Search Report and Written Opinion of the International Searching Authority, Int'l. App. No. PCT/US2015/056219, Feb. 3, 2016, European Patent Office, Rijswijk, NL, 12 pgs.

*Primary Examiner* — Mohammad Anwar
*Assistant Examiner* — Angel Brockman
(74) *Attorney, Agent, or Firm* — Holland & Hart LLP

(57) ABSTRACT

A UE may use a same antenna for both Bluetooth communications and WWAN cell search and measurement operations. In order to avoid interference, the UE may adjust the periodicity of the WWAN cell search and measurement operations. Adjustment of the WWAN cell search and measurement periodicity may be based on a link quality of the Bluetooth communications.

30 Claims, 10 Drawing Sheets

(56) References Cited

U.S. PATENT DOCUMENTS

| | | | |
|---|---|---|---|
| 2013/0203432 A1* | 8/2013 | Wang .................. | H04W 72/082 |
| | | | 455/452.1 |
| 2013/0301420 A1 | 11/2013 | Zhang et al. | |
| 2013/0331137 A1* | 12/2013 | Burchill .............. | H04W 52/243 |
| | | | 455/501 |
| 2015/0092638 A1* | 4/2015 | Dural .................. | H04W 76/048 |
| | | | 370/311 |

* cited by examiner

| Bluetooth PFR | Audio Quality MOS | | Estimated User Acceptance | | | |
|---|---|---|---|---|---|---|
| | Subjective Estimate across all use cases | Expected Measured Score | Premium Tier | High Tier | Mid Tier | Value Tier |
| 0% | perfect | 5 | yes | yes | yes | yes |
| 1% | best | 4.5 | yes | yes | yes | yes |
| 2% | good for HiFi | 4 | yes | yes | yes | yes |
| 3% | OK for HiFi | 3.7 | yes | yes | yes | yes |
| 4% | good for voice | 3.5 | no | maybe | yes | yes |
| 5% | OK for voice | 3 | no | no | maybe | yes |
| 6% | fair for voice | 2.7 | no | no | no | yes |
| >7% | barely intelligible | 2.5 | no | no | no | no |

FIG. 3

LTE CELL SEARCH AND BLUETOOTH ESCO COEXISTENCE USING SHARED ANTENNA

BACKGROUND

Field of the Disclosure

The present disclosure, for example, relates to wireless communication systems, and more particularly to use of a shared antenna for wireless wide area network (WWAN) cell search and/or measurements and Bluetooth (BT) communications.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In addition to communicating with a base station, a UE may also communicate with an access point (AP). Communication with a base station and an access point may use different radio access technologies (RATs). For example, communication between a UE and a base station may use a wireless wide area network (WWAN), while communication between a UE and an access point may use a wireless local area network (WLAN). One example WLAN communication protocol is Bluetooth communication.

While the UE may include multiple antennas and modems, including WWAN and WLAN modems, there may be times that at least portions of a single modem and antenna are used for both WWAN and WLAN communications. As an example, a UE may, at times, use a WLAN modem and antenna to facilitate both Bluetooth communications and certain types of WWAN communications. For example, the WLAN modem and antenna may be used for WWAN cell search and measurement operations while also being used for Bluetooth communications. In this scenario, coordination between the WWAN cell search and measurement operations and the Bluetooth communications may be useful in order to reduce potential interference.

SUMMARY

A UE may include multiple antennas and multiple modems that may generally be used for different radio access technologies (RATs). However, a UE may also use the same antenna and at least parts of an associated modem for different RATs. In the case where a UE uses a single antenna for both Bluetooth communications and certain WWAN communications, the UE may include functionality to adjust the WWAN communications in order to avoid interference with the Bluetooth communications. In particular, when the UE is engaged in Bluetooth (BT) extended Synchronous Connection Oriented (eSCO) communications (for example, for voice-based communications), the UE may determine that WWAN cell search and measurement operations on a shared antenna may be adjusted in order to reduce interference. The level of adjustment may be determined by measuring a link quality of the BT eSCO communications (for example, a packet error rate (PER)). Based on the measured link quality, the periodicity of the WWAN cell search and measurement operations may be adjusted from a minimum periodicity to a maximum periodicity or anywhere in between.

In a first illustrative embodiment, a method for wireless communications is disclosed. The method may include using a receive chain for both Bluetooth (BT) communications and wireless wide area network (WWAN) cell search and/or measurements, detecting a BT link quality for the BT communications, and adjusting a periodicity of the WWAN cell search and/or measurements based on the BT link quality.

In one aspect, the adjusting of the periodicity of the WWAN cell search and/or measurements may include determining a type of the BT communications, parameters of the BT communications, and a BT packet type used for the BT communications, and adjusting the periodicity of the WWAN cell search and/or measurements based on at least one of the BT link quality, the type of the BT communications, the parameters of the BT communications, and the BT packet type used for the BT communications. In another aspect, using the receive chain may include using the receive chain for BT communications that include enhanced voice (EV) packet type EV3, 2EV3 or 3EV3. Using the receive chain may also include using the receive chain for WWAN cell search and/or measurements on a frequency or radio access technology (RAT) that is different from a frequency or RAT used by a second receive chain.

In one aspect, the detecting the BT link quality may include determining a packet error rate (PER) for the BT communications. The adjusting of the periodicity of the WWAN cell search and/or measurements may further include increasing the periodicity of the WWAN cell search and/or measurements as the BT PER increases, the periodicity of the WWAN cell search and/or measurements having an upper limit based on the WWAN. The adjusting of the periodicity of the WWAN cell search and/or measurements may also include determining that the BT PER is in excess of one of a plurality of threshold PER limits; and setting the periodicity of the WWAN cell search and/or measurements based on the threshold PER limit exceeded by the BT PER. Further, the adjusting of the periodicity of the WWAN cell search and/or measurements may include setting the periodicity of the WWAN cell search and/or measurements in order to maintain a BT PER within a predetermined PER range. The determining of the PER for the BT communications may include measuring the BT PER over a predetermined period of time.

In another aspect, the adjusting of the periodicity of the WWAN cell search and/or measurements may include using a scaling factor to adjust the periodicity of the WWAN cell search and/or measurements, and may further include selecting a lowest possible scaling factor in order to maintain a BT packet error rate within a predetermined range.

In an additional aspect, the method may further include aligning a timing of the WWAN cell search and/or measurements and BT communication so that a minimum number of BT communication intervals are affected by the WWAN cell search and/or measurements.

In a second illustrative embodiment, an apparatus for wireless communication is disclosed. The apparatus may include means for using a receive chain for both Bluetooth (BT) communications and wireless wide area network (WWAN) cell search and/or measurements, means for detecting a BT link quality for the BT communications, and means for adjusting a periodicity of the WWAN cell search and/or measurements based on the BT link quality.

In one aspect, the means for adjusting of the periodicity of the WWAN cell search and/or measurements may include means for determining a type of the BT communications, parameters of the BT communications and a BT packet type used for the BT communications, and means for adjusting the periodicity of the WWAN cell search and/or measurements based on at least one of the BT link quality, the type of the BT communications, the parameters of the BT communications, and the BT packet type used for the BT communications. In another aspect, the means for using the receive chain may include means for using the receive chain for BT communications that include enhanced voice (EV) packet type EV3, 2EV3 or 3EV3. Additionally, the means for using the receive chain may include means for using the receive chain for WWAN cell search and/or measurements on a frequency or radio access technology (RAT) that is different from a frequency or RAT used by a second receive chain.

In another aspect, the means for detecting the BT link quality may include means for determining a packet error rate (PER) for the BT communications. The means for adjusting of the periodicity of the WWAN cell search and/or measurements may include means for increasing the periodicity of the WWAN cell search and/or measurements as the BT PER increases, the periodicity of the WWAN cell search and/or measurements having an upper limit based on the WWAN. The means for adjusting of the periodicity of the WWAN cell search and/or measurements may include means for determining that the BT PER is in excess of one of a plurality of threshold PER limits, and means for setting the periodicity of the WWAN cell search and/or measurements based on the threshold PER limit exceeded by the BT PER. The means for adjusting of the periodicity of the WWAN cell search and/or measurements may include means for setting the periodicity of the WWAN cell search and/or measurements in order to maintain a BT PER within a predetermined PER range. The means for determining the PER for the BT communications may further include means for measuring the BT PER over a predetermined period of time.

In yet another aspect, the means for adjusting of the periodicity of the WWAN cell search and/or measurements may include means for using a scaling factor to adjust the periodicity of the WWAN cell search and/or measurements. The apparatus may also include means for selecting a lowest possible scaling factor in order to maintain a BT packet error rate within a predetermined range. Additionally, the apparatus may further include means for aligning a timing of the WWAN cell search and/or measurements and BT communication so that a minimum number of BT communication intervals are affected by the WWAN cell search and/or measurements.

In a third illustrative embodiment, an apparatus for wireless communication is disclosed. The apparatus may include a processor, memory in electronic communication with the processor, and instructions stored in the memory. The instructions may be executable by the processor to use a receive chain for both Bluetooth (BT) communications and wireless wide area network (WWAN) cell search and/or measurements, detect a BT link quality for the BT communications, and adjust a periodicity of the WWAN cell search and/or measurements based on the BT link quality.

In an aspect, the instructions for adjusting of the periodicity of the WWAN cell search and/or measurements may include instructions executable by the processor to: determine a type of the BT communications, parameters of the BT communications and a BT packet type used for the BT communications, and to adjust the periodicity of the WWAN cell search and/or measurements based on at least one of the BT link quality, the type of the BT communications, the parameters of the BT communications, and the BT packet type used for the BT communications.

In another aspect, the instructions for detecting the BT link quality may include instructions executable by the processor to determine a packet error rate (PER) for the BT communications. The instructions for adjusting of the periodicity of the WWAN cell search and/or measurements may include instructions executable by the processor to use a scaling factor to adjust the frequency of the WWAN cell search and/or measurements.

In yet another illustrative embodiment, a non-transitory computer-readable medium storing computer-executable code for wireless communication is disclosed. The code may be executable by a processor to use a receive chain for both Bluetooth (BT) communications and wireless wide area network (WWAN) cell search and/or measurements, detect a BT link quality for the BT communications, and adjust a periodicity of the WWAN cell search and/or measurements based on the BT link quality.

In one aspect, the code for adjusting of the periodicity of the WWAN cell search and/or measurements may include code executable by the processor to determine a type of the BT communications, parameters of the BT communications, and a BT packet type used for the BT communications, and adjust the periodicity of the WWAN cell search and/or measurements based on at least one of the BT link quality, the type of the BT communications, the parameters of the BT communications, and the BT packet type used for the BT communications.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 shows a Bluetooth link quality table, in accordance with various aspects of the present disclosure;

DETAILED DESCRIPTION

Figure 1:
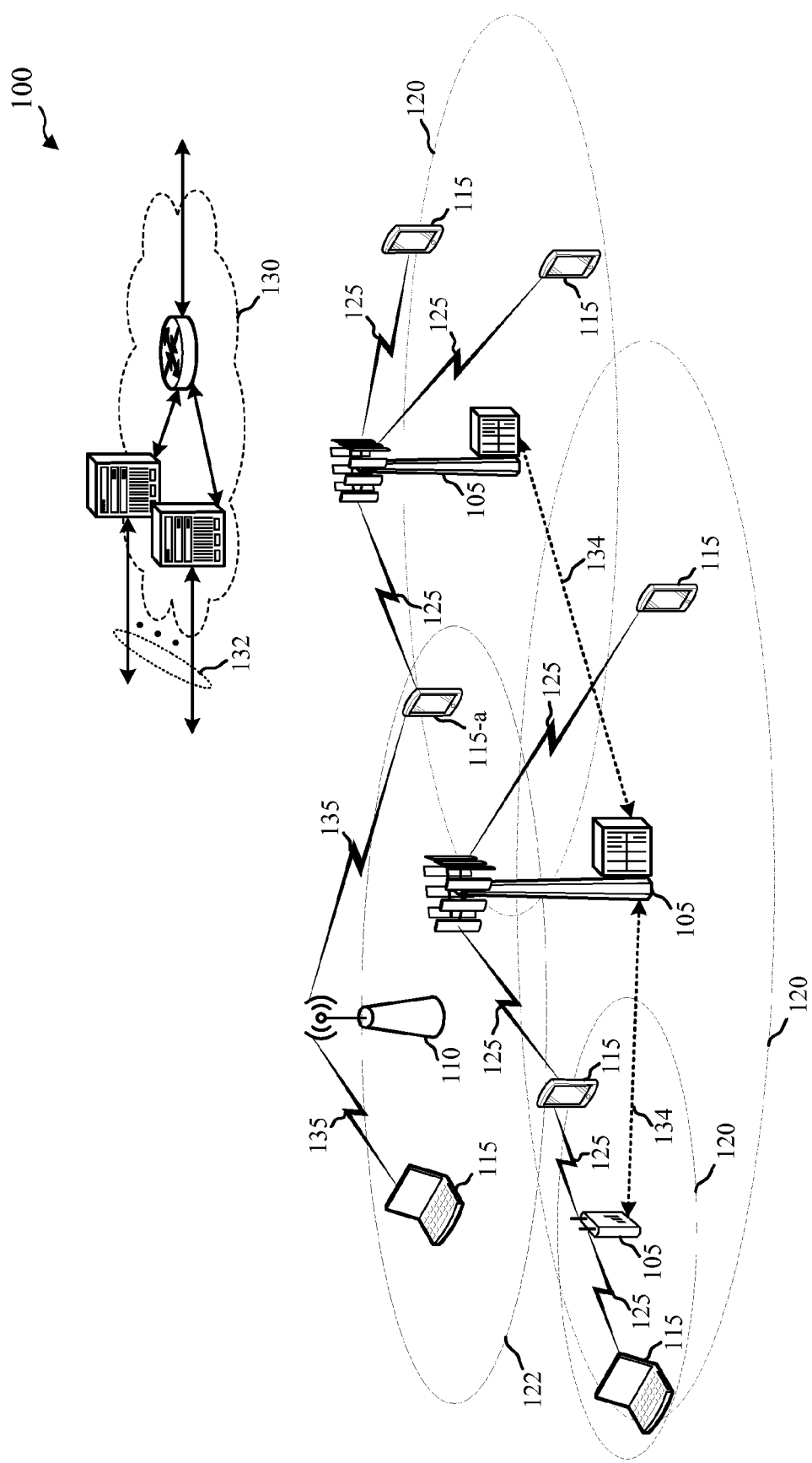
FIG. 1 shows a system diagram of a wireless communication system, in accordance with various aspects of the present disclosure.

Many UEs include multiple antennas and modems so as to facilitate communications on different RATs. In one example, a UE may include one or more WWAN antennas and may also include at least one WLAN antenna. The antennas may each have corresponding modems that include receive and transmit chains. While a UE may typically use its WLAN modem for WLAN communications, such as Bluetooth communications, the UE may have need to also use its WLAN antenna and modem for various WWAN communications. For example, a UE may be using all of its WWAN antennas and modems for ongoing WWAN communications, but may also have a need to conduct additional inter frequency WWAN cell search and measurement operations. While the UE could interrupt its ongoing WWAN communications to conduct the WWAN cell search and measurement operations, the UE may instead use its WLAN antenna and receive chain to conduct the WWAN cell search and measurement operations. In doing so, the UE avoids any interruption to its ongoing WWAN communications.

However, use of the UE's WLAN antenna for WWAN cell search and measurement operations may benefit from some additional coordination with other WLAN communications such as Bluetooth that may be occur. For example, in typical Bluetooth eSCO communications such as voice communications, the BT eSCO interval may be shorter than 5.1 ms (for example, Bluetooth communications that include enhanced voice (EV) packet type EV3 may have a BT eSCO interval of 3.75 ms). In Long-Term Evolution (LTE) cell search and measurement, LTE sample capture may be around 5.1 ms. Thus, LTE cell search and measurement operations may interfere with certain BT eSCO communications. However, the degree of interference may be reduced if the periodicity of LTE cell search and measurement operations is adjusted (e.g., increased). While LTE cell search and/or measurements often occur every 40 ms, the periodicity of the LTE cell search and/or measurements may be increased to only occur every 480 ms. The LTE cell search and/or measurement periodicity may be adjusted based on a measured link quality of the BT eSCO communications. If the BT eSCO communications link quality is high, the LTE cell search and/or measurement periodicity may be minimally adjusted. However, if the BT eSCO communications link quality is low, the LTE cell search and/or measurement periodicity may be increased in order to maintain a target BT eSCO communications link quality. The LTE cell search and/or measurement periodicity may thus be set equal to 40*k ms, where k may be an integer varying from 1 to 12, depending on the BT eSCO communications link quality. The BT eSCO communications link quality may be measured by the BT packet error rate (PER).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a system diagram illustrates an example of a wireless communication system 100. The wireless communication system 100 may include base station(s) 105, access point(s) (AP) 110, and mobile devices such as UEs 115. The AP 110 may provide wireless communications via a WLAN radio access network (RAN) such as, e.g., a network implementing at least one of the IEEE 802.11 family of standards. The AP 110 may provide, for example, Bluetooth communications access to a UE. Each AP 110 has a geographic coverage area 122 such that UEs 115 within that area can typically communicate with the AP 110. UEs 115 may be multi-access mobile devices that communicate with the AP 110 and a base station 105 via different radio access networks. The UE 115, such as mobile stations, personal digital assistants (PDAs), other handheld devices, netbooks, notebook computers, tablet computers, laptops, display devices (e.g., TVs, computer monitors, etc.), printers, etc., may be stationary or mobile and traverse the geographic coverage areas 122 and/or 120, the geographic coverage area of a base station 105. While only one AP 110 is illustrated, the wireless communication system 100 may include multiple APs 110. Some or all of the UEs 115 may associate and communicate with an AP 110 via a communication link 135 and/or with a base station 105 via a communication link 125.

The wireless communications system 100 may also include a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

Although not shown in FIG. 1, a UE 115 can be covered by more than one AP 110 and/or base station 105 and can therefore associate with multiple APs 110 or base stations 105 at different times. For example, a single AP 110 and an associated set of UEs 115 may be referred to as a basic service set (BSS). An extended service set (ESS) is a set of connected BSSs. A distribution system (DS) (not shown) is used to connect APs 110 in an extended service set. A geographic coverage area 122 for an access point 110 may be divided into sectors making up only a portion of the geographic coverage area (not shown). The wireless communication system 100 may include APs 110 of different types (e.g., metropolitan area, home network, etc.), with varying sizes of coverage areas and overlapping coverage areas for different technologies. Although not shown, other wireless devices can communicate with the AP 110.

The base stations 105 may wirelessly communicate with the UEs 115 via base station antennas. Each of the base station 105 sites may provide communication coverage for a respective geographic coverage area 120. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 120 for a base station 105 may be divided into sectors making up only a portion of the coverage area (not shown). The wireless communication system 100 may include base stations 105 of different types (e.g., macro and/or small cell base stations). There may be overlapping geographic coverage areas 120/122 for different technologies.

In some examples, the wireless communication system 100 includes portions of an LTE/LTE-A network. In LTE/LTE-A networks, the term evolved Node B (eNB) may be generally used to describe the base stations 105, while the term UE may be generally used to describe the mobile devices 115. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network supporting radio bearers for the user plane data. At the Physical (PHY) layer, the transport channels may be mapped to Physical channels.

The UEs 115 are dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, APs, and the like.

The communication links 125 shown in wireless communication system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include at least one carrier, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105, APs 110, and/or UEs 115 may include multiple antennas for employing antenna diversity schemes to improve communication quality and reliability between base stations 105, APs 110, and UEs 115. Additionally or alternatively, base stations 105, APs 110, and/or UEs 115 may employ multiple-input, multiple-output (MIMO) techniques that may take advantage of multi-path environments to transmit multiple spatial layers carrying the same or different coded data.

System 100 includes a UE 115-a which is in communication with both a base station 105 and an access point 110. As an example, UE 115-a may communicate with the access point 110 using Bluetooth communications while the UE 115-a may communicate with the base station 105 using LTE or other WWAN communications. The communications may be at the same time. As an example, the UE 115-a may be used in a vehicle that includes a Bluetooth hands-free communication system. In such a situation, the UE 115-a may engage in cellular voice communication with a base station 105 while also relaying the voice communication over the hands-free Bluetooth communication system in the vehicle. Additionally, while the simultaneous WWAN and Bluetooth communications are occurring, the UE 115-a may have further need to conduct an inter-frequency WWAN cell search and measurement. This situation is illustrated in greater detail in FIG. 2.

Figure 2:
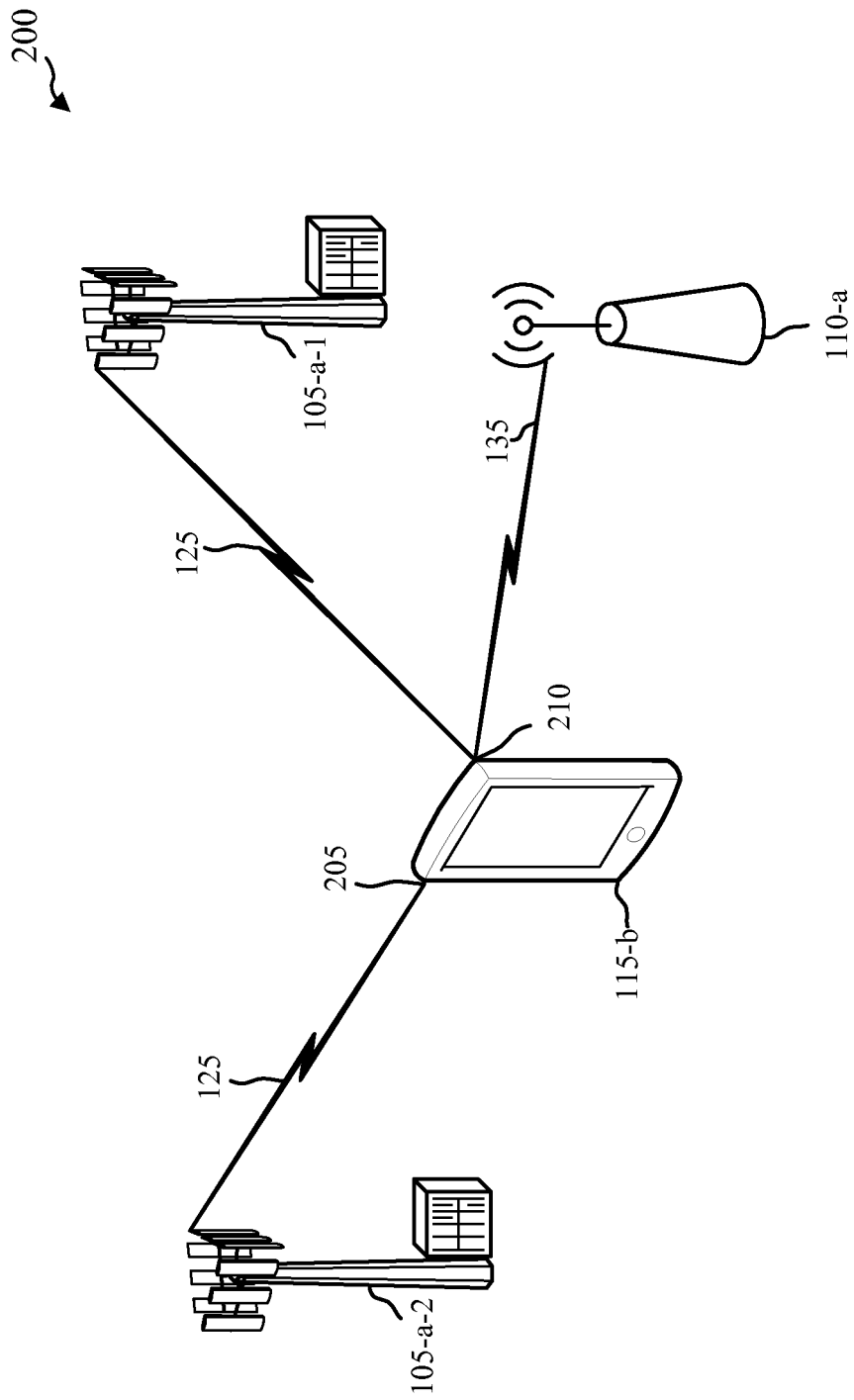
FIG. 2 shows a system diagram of a wireless communication system, in accordance with various aspects of the present disclosure.

FIG. 2 illustrates a system diagram that shows an example of a wireless communication system 200. The wireless communication system 200 may include base stations 105-a-1, 105-a-2, access point 110-a and UE 115-b. The UE 115-b may be an example of UE 115-a in system 100 of FIG. 1 and may be engaged in both WWAN and Bluetooth communications. The base stations 105-a-1, 105-a-2 may be examples of base stations 105 included in system 100 of FIG. 1, and the access point 110-a may be an example of the access point 110 in system 100 of FIG. 1.

In system 200, the UE 115-b may include at least two different antennas 205, 210. For example, antenna 205 may be a WWAN antenna and may also be associated with a WWAN modem. Using the antenna 205, the UE 115-b may engage in WWAN communications with base station 105-a-2 via communication link 125. The antenna 205 and associated WWAN modem may include both receive and transmit chains used during WWAN communications.

The UE 115-b may also include antenna 210 which may be a WLAN antenna. In system 200, the UE 115-b uses the antenna 210 to communicate with both the base station 105-a-1 (via communication link 125) and the access point 110-a (via communication link 135). The communications with the access point 110-a may be Bluetooth communications, while the communication with the base station 105-a-1 may be part of a WWAN cell search and measurement operation. Thus, both the WWAN cell search and measurement operation communications and the Bluetooth communications may share a receive chain of a WLAN modem associated with the antenna 210. The sharing of the receive chain may benefit from some coordination between the WWAN cell search and measurement operations and the Bluetooth communications, as explained in further detail below.

Typically, in LTE cell search or measurement operations, an LTE sample capture may require a minimum of 5.1 ms. While LTE standards may require that LTE cell search and measurement be performed at least every 480 ms, these measurements are often made more frequently so as to allow for averaging, for example. Thus, an LTE sample capture may occur as often as every 40 ms, meaning that 5.1 ms out of every 40 ms of use on antenna 210 could be devoted to LTE sample capture. However, if the Bluetooth communications in which the UE 115-b is engaged are voice or other communications that require low latency (such as eSCO communications used for streaming voice communications), having 5.1 ms out of every 40 ms of use be dedicated to LTE cell search and measurement operations may result in unacceptably high error rates in the simultaneous Bluetooth communications.

Table 300 in FIG. 3 helps to illustrate this point. Table 300 illustrates various audio link qualities deemed acceptable for Bluetooth communications. In table 300, Bluetooth link quality can be associated with the BT packet error rate (PER). Column 305 indicates a list of potential BT PERs. The BT PERs may also be associated with an audio quality mean opinion score (MOS), as illustrated in column 310. For example, a BT PER of 0% corresponds to a perfect sound quality having a MOS of 5. As another example, a BT PER of 3% is considered OK for HiFi and has a MOS score of 3.7. Expected measured scores ranging from 3.7 to 5 are considered acceptable for all tiers of use, as indicated in column 315, which illustrates estimated user acceptance levels for different use tiers (e.g., premium, high, mid and value UEs). However, expected measured scores that are less than 3.7 are not considered acceptable for at least some use tiers. Thus, as shown in table 300, a BT audio communication should have a PER of no more than 3% if the BT link quality is to be deemed sufficient for low-latency audio communications (such as eSCO communications).

Figure 4:
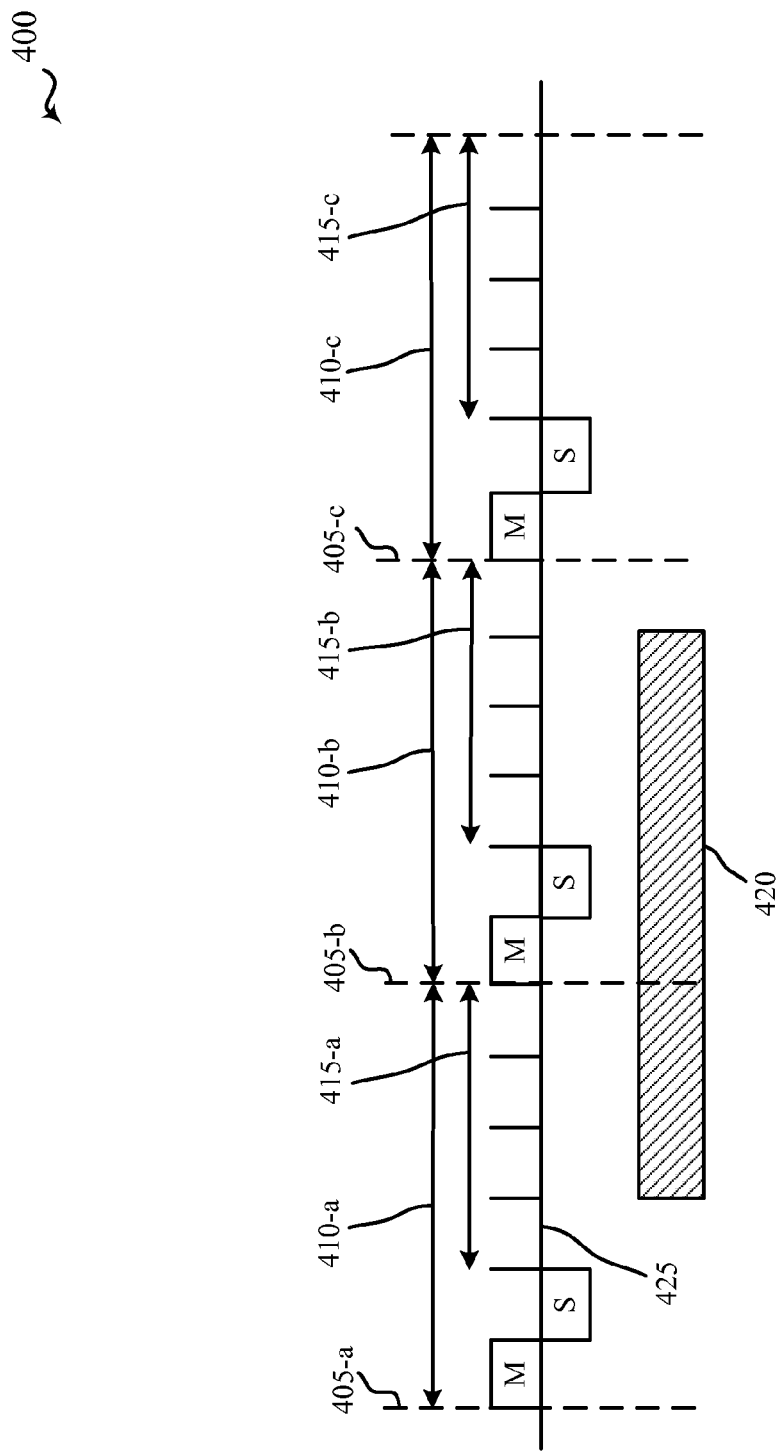
FIG. 4 shows a Bluetooth and WWAN communications timing diagram, in accordance with various aspects of the present disclosure.

This point is also illustrated in FIG. 4, which shows a Bluetooth and WWAN communications timing diagram 400; In particular, timing diagram 400 illustrates the possible timing of both BT eSCO communications and LTE cell search and measurement operations that may share a same receive chain of an antenna (for example, antenna 210 of FIG. 2). Timing diagram 400 is specific to enhanced voice (EV) packet type EV3 communications, which some UEs may utilized for their BT eSCO communications.

As shown in timing diagram 400, an EV3 eSCO interval 410 typically includes six BT slots 425. Thus, timing diagram 400 illustrates EV3 eSCO intervals 410-a, 410-b and 410-c that each include six BT slots 425. Within each EV3 eSCO interval 410, one BT slot 425 is reserved for master-to-slave transmission (indicated in timing diagram 400 as a BT slot M) while another BT slot 425 is reserved for slave-to-master transmission (indicated in timing diagram 400 as a BT slot S). Following the BT slots M and S, each EV3 eSCO interval 410 includes four BT slots 425 that are reserved for retransmissions. These retransmission slots make up the retransmission window 415. Timing diagram 400 includes retransmission windows 415-a, 415-b and 415-c. The beginning of each EV3 eSCO interval 410 is referred to as the eSCO instant 405. Timing diagram 400 includes eSCO instants 405-a, 405-b and 405-c. Thus, timing diagram 400 illustrates three consecutive EV3 eSCO intervals 410-a, 410-b and 410-c with their component BT slots 425.

If WWAN cell search and measurement operations (such as LTE cell search and measurement operations) are simultaneously performed using the same antenna and receive chain (such as antenna 210 of FIG. 2), the WWAN cell search and measurement operation may overlap with one or more BT slots M, S of EV3 eSCO intervals 410. Thus, in timing diagram 400, LTE sample capture 420 is illustrated as overlapping with two EV3 eSCO intervals 410-a, 410-b, including the BT slots M, S of EV3 eSCO interval 410-b. As explained above, an LTE sample capture may take around 5.1 ms. In EV3 eSCO, the EV3 eSCO interval is typically 3.75 ms. Thus, an overlap of the LTE sample capture 420 and one or more EV3 eSCO intervals 410 is guaranteed to occur if these two processes share a same antenna and receive chain and happen at the same time. Proper aligning of the LTE sample capture 420 can minimize the number of EV3 eSCO intervals 410 that are impacted, and, in particular, the number of BT slots M and S that are affected, but some overlap (and thus interference) is guaranteed.

Figure 5:
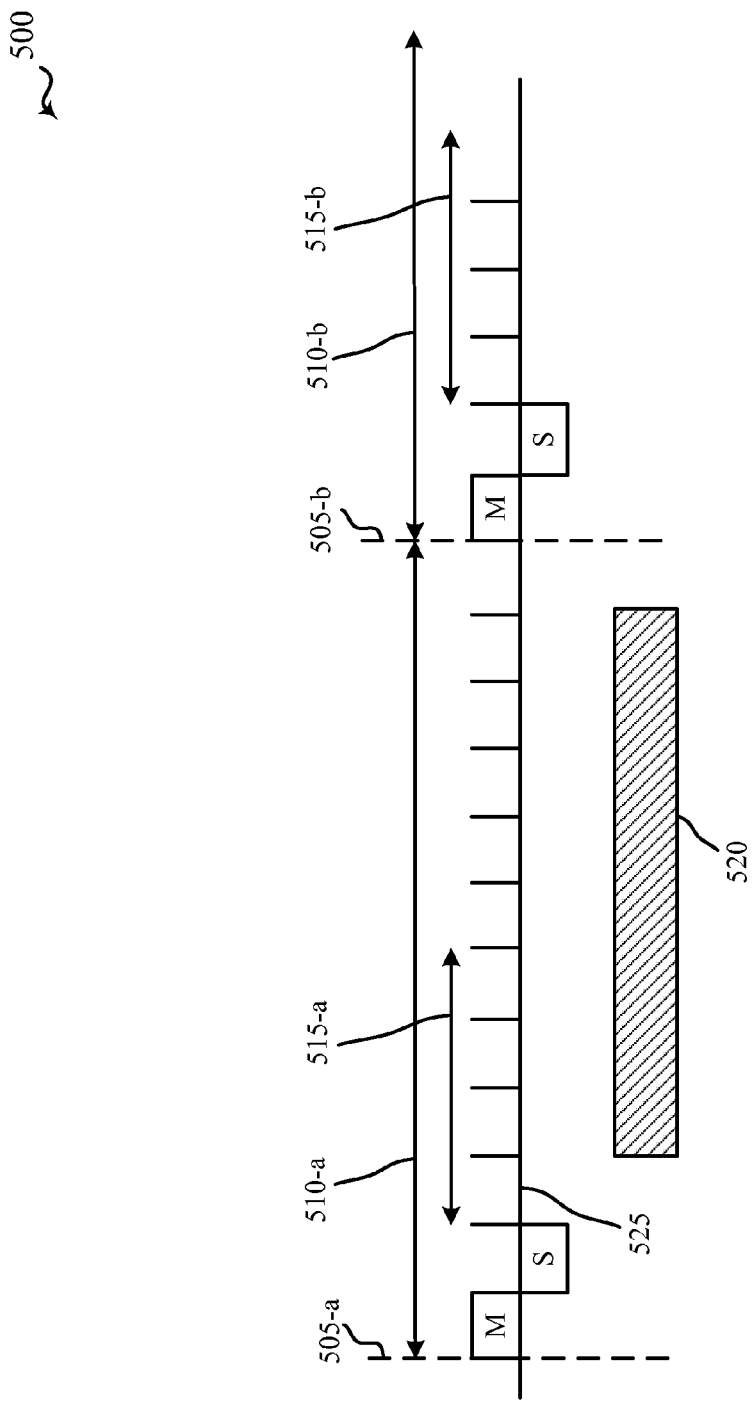
FIG. 5 shows a Bluetooth and WWAN communications timing diagram, in accordance with various aspects of the present disclosure.

FIG. 5 illustrates a Bluetooth and WWAN communications timing diagram 500 that pertains to enhanced voice (EV) packet type 2EV3, which is less stringent than packet type EV3. As shown in timing diagram 500, a 2EV3 eSCO interval 510 typically includes twelve BT slots 525. Thus, timing diagram 500 illustrates 2EV3 eSCO intervals 510-a, and 510-b that each include twelve BT slots 525. Each 2EV3 eSCO interval 510 also includes a master-to-slave transmission BT slot M and a slave-to-master transmission BT slot S. Following the BT slots M and S, each 2EV3 eSCO interval 510 includes four BT slots 525 that are reserved for retransmissions. These retransmission slots make up the retransmission window 515. Timing diagram 500 includes retransmission windows 515-a and 515-b. Each 2EV3 eSCO interval 510 also includes an eSCO instant 505-a, 505-b. Thus, timing diagram 500 illustrates two consecutive 2EV3 eSCO intervals 510-a, 510-b with their component BT slots 525. As shown in timing diagram 500, a properly aligned LTE sample capture 520 may only overlap a single 2EV3 eSCO interval 510, and may not overlap any BT slots M, S.

Nevertheless, in both the EV3 and 2EV3 eSCO situations, too frequent LTE sample capture may result in unacceptably high levels of interference with the ongoing BT communications. For example, LTE sample capture every 40 ms during EV3 eSCO communications can result in a BT PER of around 9.375%. As shown in the table 300 of FIG. 3, a BT PER of 9.375% would not be acceptable for any tier of use.

In order to reduce the BT PER during LTE cell search and/or measurement using a shared antenna, the periodicity of the LTE cell search or measurement can be increased. More specifically, while using a shared antenna for both BT eSCO and LTE cell search or measurement, the periodicity of the LTE cell search and/or measurement can be increased by a factor of "k," where k can vary between 1 and 12. LTE search and measurement periodicity then becomes 40*k ms. When k=1 (meaning that no BT eSCO communications are occurring), LTE cell search may occur every 40 ms. When k=12, LTE cell search and/or measurement may occur every 480 ms. k may be chosen based on the BT eSCO PER; a lowest possible value of k may be selected in order to maintain a BT eSCO PER of from 2-3%, corresponding to an acceptable MOS as shown in table 300 of FIG. 3. Thus, when BT link quality is good, k can be 3 or 4. Medium BT link quality results in k being closer to 8. A poor BT link quality results in k being 12.

In addition, LTE sample capture may be temporally aligned with the BT eSCO intervals in order to further reduce the chance of interference. As explained above, for EV3 packet type BT eSCO, LTE sample capture is guaranteed to impact at least one BT eSCO interval, and possibly two if the LTE sample capture and BT eSCO interval are not aligned properly. For 2EV3 packet types (or for other less stringent packet types such as 3EV3, etc.), LTE sample capture could also impact up to one BT eSCO interval if not aligned properly. Thus, LTE sample capture and BT eSCO intervals may be aligned. Then, the BT PER may be measured over a window of time. If the measured PER is not greater than a first low threshold (meaning that the BT link quality is good), then a low measurement periodicity (low k) may be selected. If the measured PER is greater than the first low threshold but not greater than a second high threshold (meaning that the BT link quality is medium), then a medium measurement periodicity (medium k) may be selected. If the measured PER is greater than the second high threshold (meaning that the BT link quality is poor), then a high measurement periodicity may be selected.

Figure 6:
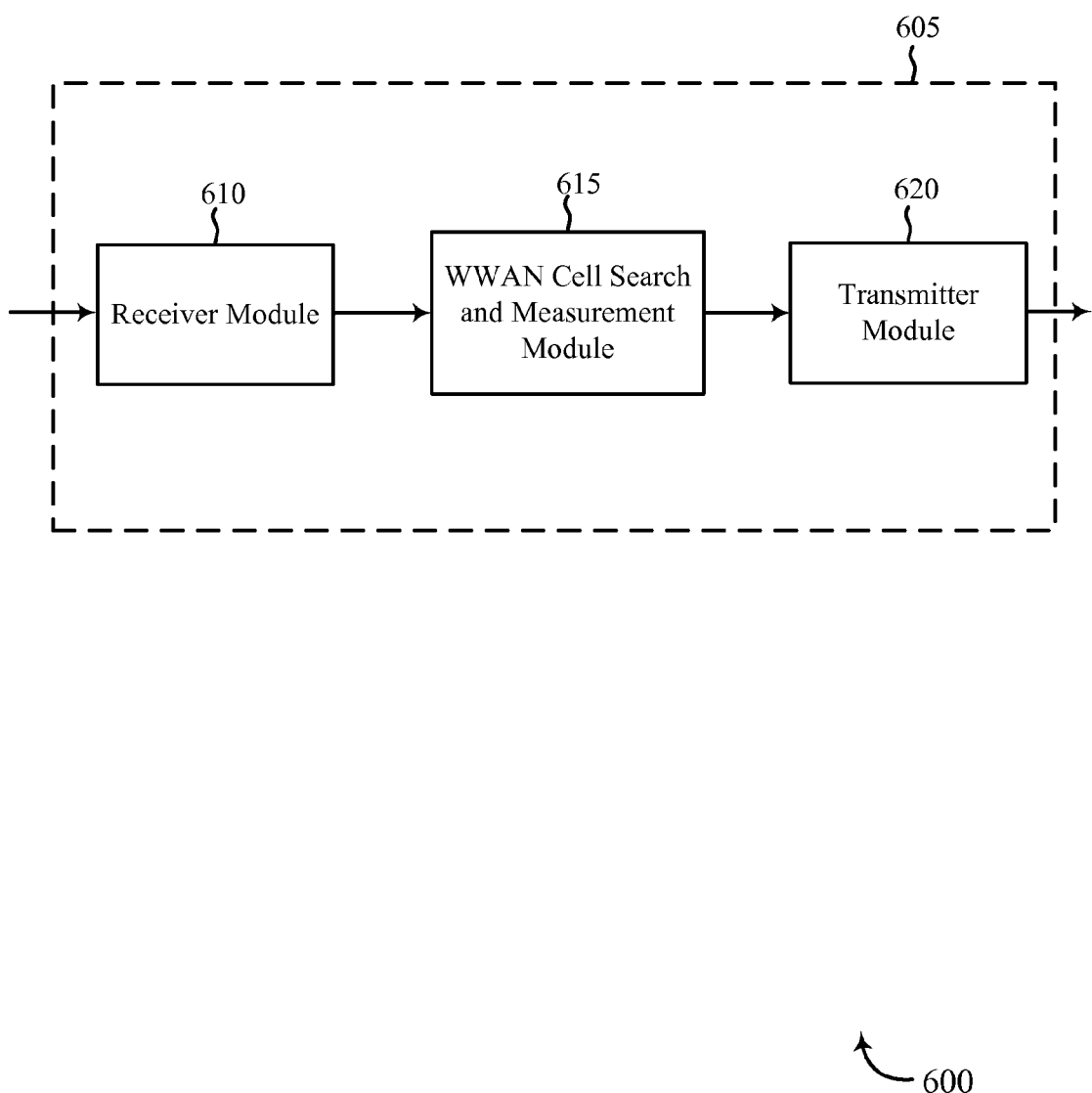
FIG. 6 shows a block diagram of a device configured for use in wireless communication, in accordance with various aspects of the present disclosure.

FIG. 6 shows a block diagram 600 of a device 605 for use in wireless communication, in accordance with various aspects of the present disclosure. The device 605 may be an example of one or more aspects of a UE 115 described with reference to FIGS. 1 and/or 2. The device 605 may include a receiver module 610, a WWAN cell search and measurement module 615, and/or a transmitter module 620. The device 605 may also be or include a processor (not shown). Each of these modules may be in communication with each other.

The components of the device 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 610 may receive information such as packets, user data, and/or control information associated with various information channels (e.g., control channels, data channels, etc.). The receiver module 610 may be a WLAN receiver module and may be configured to receive both WLAN communications (such as Bluetooth communications) as well as WWAN cell search and measurement information. The receiver module 610 may also be used to determine a link quality (such as a PER) of any ongoing BT eSCO communications. Information received may be passed on to the WWAN cell search and measurement module 615, and to other components of the device 705.

The WWAN cell search and measurement module 615 may be used to determine that both BT eSCO communications and a WWAN cell search and measurement operation are being performed simultaneously using a single antenna. When such is the case, the WWAN cell search and measurement module 615 may determine a link quality, such as a PER for the ongoing BT eSCO communications. Based on the determined link quality, the WWAN cell search and measurement module 615 may also adjust the periodicity of the ongoing WWAN cell search and/or measurement. The WWAN cell search and/or measurement periodicity may be adjusted by a factor of 40*k. A low PER (of, for example, around 1%) could result in a low k of either 3 or 4. A medium PER (of, for example, between 1% and 2%) could result in a medium k of around 8. A high PER (of, for example, greater than 2%) could result in a high k of around 12. A WWAN cell search and/or measurement periodicity equal to 40*12 is equal to the LTE maximum periodicity of 480 ms.

The transmitter module 620 may be used to transmit the BT eSCO communications in accordance with the description above, and may also transmit one or more signals received from other components of the device 605. In some examples, the transmitter module 620 may be collocated with the receiver module 610 in a transceiver module.

Figure 7:
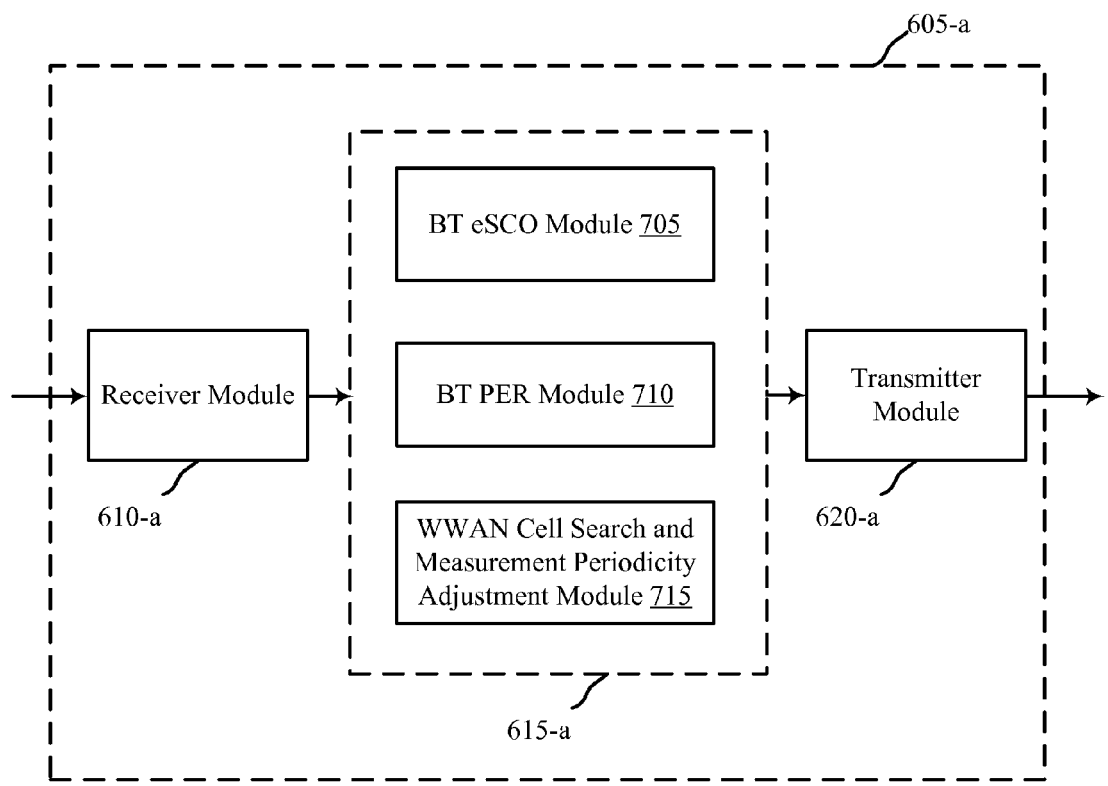
FIG. 7 shows a block diagram of a device configured for use in wireless communication, in accordance with various aspects of the present disclosure.

FIG. 7 shows a block diagram 700 of a device 605-a for use in wireless communication, in accordance with various examples. The device 605-a may be an example of one or more aspects of a UE 115 described with reference to FIGS. 1 and/or 2. It may also be an example of a device 605 described with reference to FIG. 6. The device 605-a may include a receiver module 610-a, a WWAN cell search and measurement module 615-a, and/or a transmitter module 620-a, which may be examples of the corresponding modules of device 605. The device 605-a may also include a processor (not shown). Each of these components may be in communication with each other. The WWAN cell search and measurement module 615-a may include a BT eSCO module 705, a BT PER module 710, and/or a WWAN cell search and measurement periodicity adjustment module 715. The receiver module 610-a and the transmitter module 620-a may perform the functions of the receiver module 610 and the transmitter module 620, of FIG. 6, respectively.

The BT eSCO module 705 may be used by the WWAN cell search and measurement module 615-a to determine whether BT eSCO communications are ongoing and being shared with WWAN cell search and measurement operations on a same antenna. If BT eSCO communications are not ongoing, even if a shared antenna is being used for both Bluetooth and WWAN cell search and measurement operations, the WWAN cell search and measurement module 615-a man not need to be used; timing between the Bluetooth and WWAN operations may not need to be adjusted. However, if Bluetooth communications that require low latency, such as BT eSCO communications, are occurring while WWAN cell search and measurement operations are also occurring, an adjustment of the WWAN sample capture may be desired. Therefore, the BT eSCO module 705 may be used to determine whether BT eSCO communications are simultaneously occurring with WWAN cell search and measurement on a same antenna.

The BT PER module 710 may be used to determine a PER or link quality of an ongoing BT eSCO communication. The PER or link quality may be determined in order to allow the WWAN cell search and measurement module 615-a to determine whether a WWAN cell search and/or measurement periodicity should be adjusted. A BT PER of from 2% to 3% is considered to be acceptable for most BT eSCO communications. Thus, a WWAN cell search and/or measurement periodicity may be adjusted in order to maintain at least a BT PER of 2-3%.

The WWAN cell search and measurement periodicity adjustment module 715 may use the BT PER determined by the BT PER module 710 to determine an extent of adjustment that should be made to the WWAN cell search and/or measurement periodicity. The WWAN cell search and/or measurement periodicity may be adjusted by a factor of 40*k. A low BT PER (of, for example, around 1%) could result in a low k of either 3 or 4. A medium BT PER (of, for example, between 1% and 2%) could result in a medium k of around 8. A high PER (of, for example, greater than 2%) could result in a high k of around 12. Thus, the WWAN cell search and/or measurement periodicity may be adjusted from 40 ms (for best case BT PER) to 480 ms (for poor BT PER).

Figure 8:
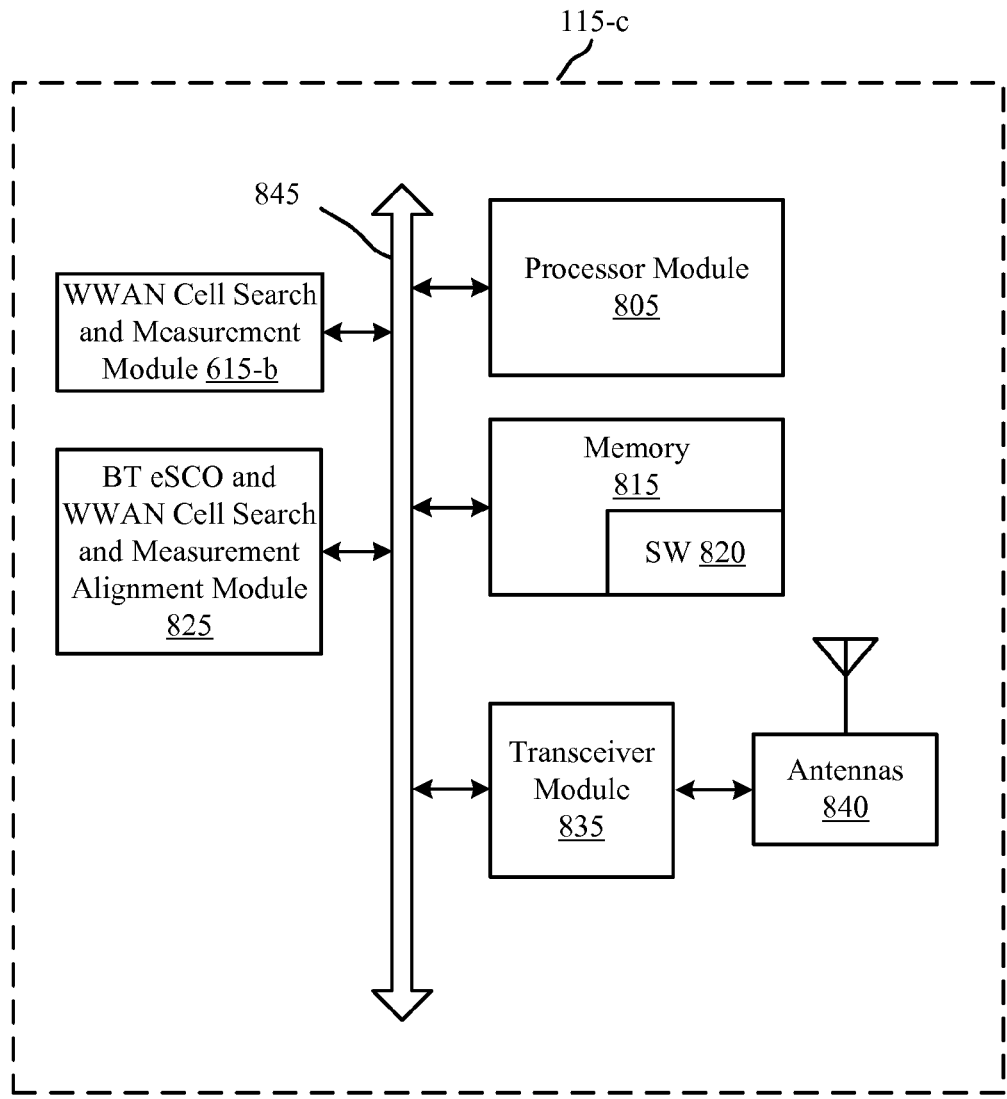
FIG. 8 shows a block diagram of a wireless communication system, in accordance with various aspects of the present disclosure.

FIG. 8 shows a system 800 for use in wireless communication, in accordance with various examples. System 800 may include a UE 115-c, which may be an example of the UEs 115 of FIGS. 1 and/or 2. UE 115-c may also be an example of one or more aspects of devices 605 of FIGS. 6 and/or 7.

The UE 115-c may generally include components for bi-directional voice and data communications including components for transmitting communications and components for receiving communications. The UE 115-c may include antennas 840, a transceiver module 835, a processor module 805, and memory 815 (including software (SW) 820), which each may communicate, directly or indirectly, with each other (e.g., via one or more buses 845). The transceiver module 835 may be configured to communicate bi-directionally, via the antennas 840 and/or one or more wired or wireless links, with one or more networks, as described above. For example, the transceiver module 835 may be configured to communicate bi-directionally with base stations 105 and with the access points 110 with reference to FIGS. 1 and/or 2. The transceiver module 835 may include a modem configured to modulate the packets and provide the modulated packets to the antennas 840 for transmission, and to demodulate packets received from the antennas 840. The UE 115-c may have multiple antennas 840 capable of concurrently transmitting and/or receiving multiple wireless transmissions. The transceiver module 835 may be capable of concurrently communicating with one or more base stations 105 via multiple component carriers. Additionally, the transceiver module 835 may include a modem capable of communicating with both a base station 105 and an access point 110. As an example, the transceiver module 835 may include a modem capable of processing Bluetooth communications at the same time that WWAN cell search and measurement operations are performed.

The UE 115-c may include a WWAN cell search and measurement module 615-b, which may perform the functions described above for the WWAN cell search and measurement modules 615 of device 605 of FIGS. 6 and 7. The UE 115-c may also include a BT eSCO and WWAN cell search and measurement alignment module 825. The BT eSCO and WWAN cell search and measurement alignment module 825 may be used to ensure that BT eSCO intervals and WWAN sample capture are temporally aligned so that interference between the Bluetooth communications and the WWAN cell search and measurement operations is reduced and/or minimized. This means that if the Bluetooth communications include EV3 eSCO communications, the WWAN sample capture is aligned to only overlap with two EV3 eSCO intervals and only one master-to-slave transmission BT slot and slave-to-master transmission BT slot (of one of the overlapped EV3 eSCO intervals). If the Bluetooth communications include 2EV3 eSCO communications, the WWAN sample capture is aligned to only overlap with one 2EV3 eSCO interval and no master-to-slave transmission BT slots or slave-to-master transmission BT slots.

The memory 815 may include random access memory (RAM) and read-only memory (ROM). The memory 815 may store computer-readable, computer-executable software/firmware code 820 containing instructions that are configured to, when executed, cause the processor module 805 to perform various functions described herein (e.g., measure BT PER and adjust WWAN sample capture periodicity, etc.). Alternatively, the computer-readable, computer-executable software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an application-specific integrated circuit (ASIC), etc.

Figure 9:
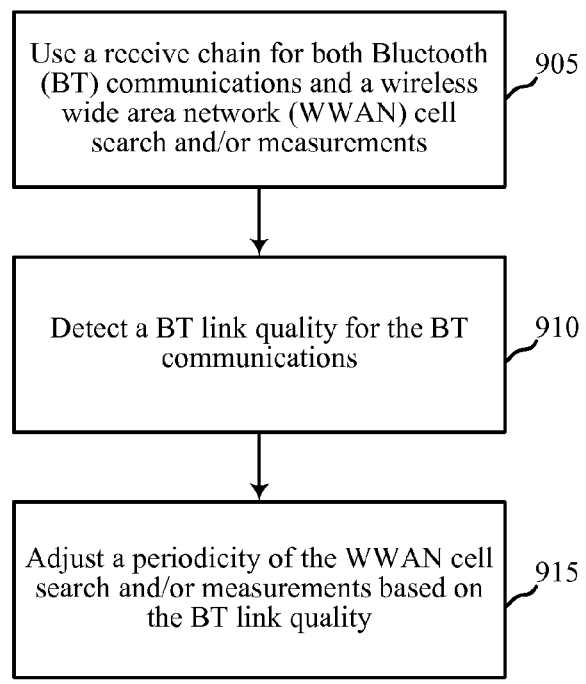
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the UEs 115 described with reference to FIGS. 1, 2 and/or 8, and/or aspects of one or more of the devices 605 described with reference to FIGS. 6 and/or 7. In some examples, a UE may execute one or more sets of codes to control the functional elements of the UE to perform the functions described below. Additionally or alternatively, the UE may perform one or more of the functions described below using special-purpose hardware.

At block 905, the method 900 may include using a receive chain for both Bluetooth (BT) communications and a wireless wide area network (WWAN) cell search and/or measurement. Thus, while the UE may include multiple antennas, the UE is using a same antenna for both Bluetooth communications and WWAN cell search and measurement. The Bluetooth communications may be eSCO communications, for example, and thus require low latency. The operations at block 905 may be performed using the WWAN cell search and measurement module 615 described with reference to FIGS. 6, 7 and/or 8, and in particular the BT eSCO module 705 of FIG. 7.

At block 910, the method 900 may include detecting a BT link quality for the BT communications. This may be done by detecting a BT PER, for example, of the BT communications. The BT PER may be detected so as to determine whether the Bluetooth communication has a sufficient link quality to support eSCO communications, or whether a WWAN cell search and/or measurement periodicity should be adjusted so as to improve the BT PER. The operations at block 910 may be performed using the WWAN cell search and measurement module 615 described with reference to FIGS. 6, 7 and/or 8, and in particular the BT PER module 710 of FIG. 7.

At block 915, the method 900 may include adjusting a periodicity of the WWAN cell search and/or measurement based on the BT link quality. The WWAN cell search and/or measurement periodicity may be set as 40*k, for example, where the variable k may be adjusted based on the BT PER. A low PER (below a first threshold) may result in use of a low k. A medium PER (in between a low threshold and a high threshold) may result in use of a medium k. A high PER (above a high threshold) may result in use of a high k. The variable k may vary from 1 to 12. The operations at block 915 may be performed using the WWAN cell search and measurement module 615 described with reference to FIGS. 6, 7 and/or 8, and in particular the WWAN cell search and measurement periodicity adjustment module 715 of FIG. 7.

Thus, the method 900 may provide for wireless communication. It should be noted that the method 900 is just one implementation and that the operations of the method 900 may be rearranged or otherwise modified such that other implementations are possible.

Figure 10:
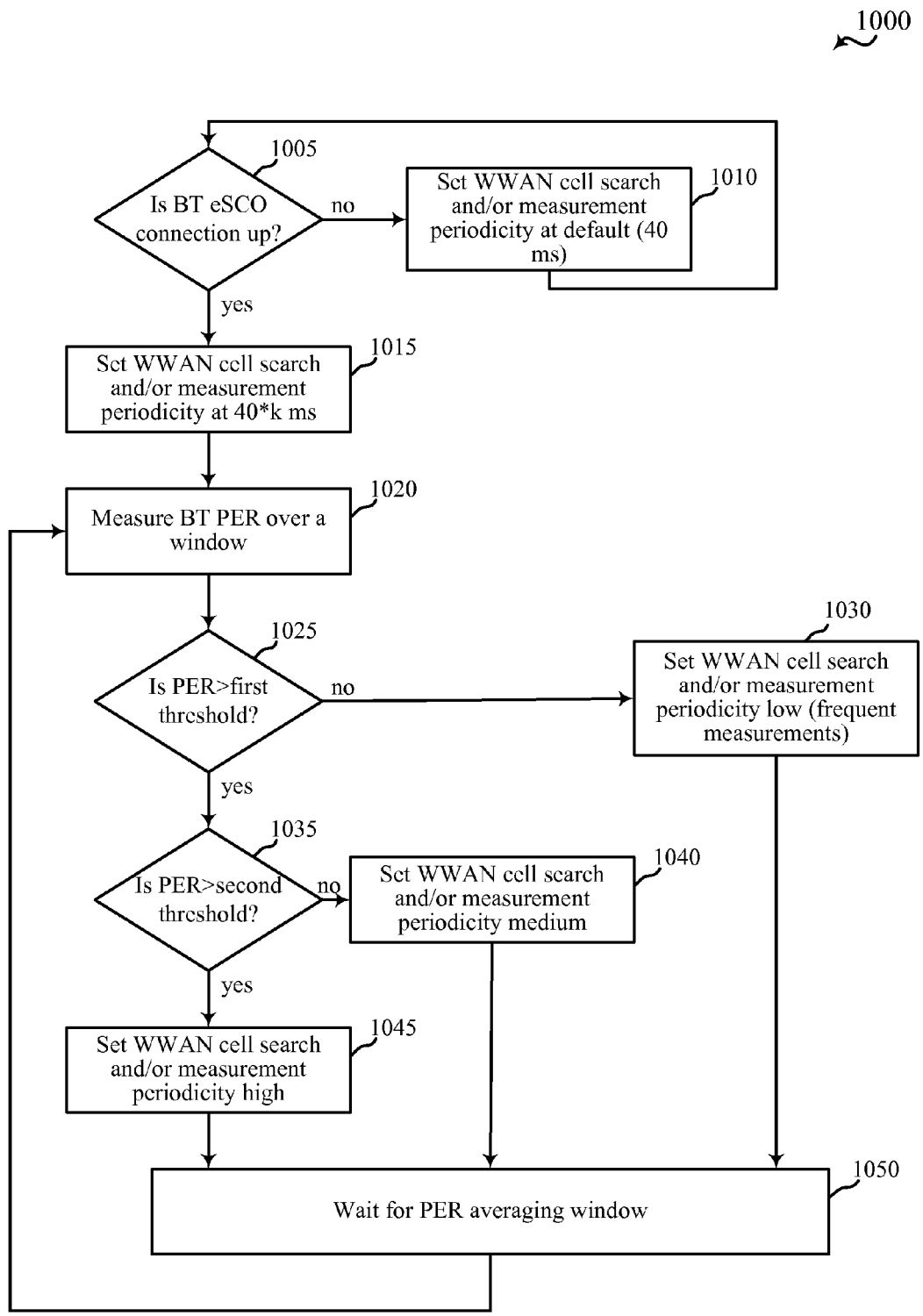
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the UEs 115 described with reference to FIGS. 1, 2 and/or 8, and/or aspects of one or more of the devices 605 described with reference to FIGS. 6 and/or 7. In some examples, a UE may execute one or more sets of codes to control the functional elements of the UE to perform the functions described below. Additionally or alternatively, the UE may perform one or more of the functions described below using special-purpose hardware.

At block 1005, the method 1000 may include determining whether the UE is using a low latency Bluetooth communication such as BT eSCO communication. If the UE is not engaged in BT eSCO communications, then any ongoing WWAN cell search and measurement operation may continue at its default periodicity (at block 1010). If, however, the UE is engaged in BT eSCO communications, and WWAN cell search and measurement operations are occurring using a shared WLAN antenna, then the periodicity of the WWAN cell search and measurement may be adjusted.

At block 1015, the method 1000 may include preparing for adjustment of WWAN cell search and measurement periodicity by setting the cell search and/or measurement periodicity equal to 40*k ms, where k is an integer than is equal to or greater than one. For LTE cell search and measurement, k may be an integer ranging from one to twelve in value. In other WWAN systems, k may have a different maximum value.

At block 1020, the method 1000 may include measuring the BT PER over a window of time. The BT PER may be measured so as to determine whether the link quality of the BT eSCO communication is acceptable and, if it isn't, whether the periodicity of the WWAN cell search and measurement should be adjusted.

At block 1025, the measured BT PER is compared with a first threshold. The first threshold may be a low threshold, indicating that measured BT PERs that are less than the first threshold represent generally good link quality. The first threshold could be, for example, equal to 1%. Thus if the measured PER is less than the first threshold (e.g., 1%), the WWAN cell search and measurement periodicity may be set to be low (at block 1030). This means that frequent WWAN cell search and measurements may be made, as the BT link quality is considered to be good. In this instance, k may be set to range from 1 to 4.

If the measured BT PER is determined to be greater than the first threshold (at block 1025), the measured BT PER is compared with a second threshold (at block 1035). The second threshold may be a high threshold, indicating that measured BT PERs that are higher than the second threshold represent generally poor link quality. Measured BT PERs that are in between the first and second threshold represent generally medium link quality. The second threshold could be, for example, equal to 2%. Thus if the measured PER is greater than the first threshold (e.g., 1%) but less than the second threshold (e.g., 2%), the WWAN cell search and measurement periodicity may be set to be medium (at block 1040). This means that WWAN cell search and measurements may be set to be less frequent, as the BT link quality is considered to only be medium. In this instance, k may be set to range from 5 to 8.

If the measured PER is greater than the second threshold (e.g., 2%), the WWAN cell search and measurement periodicity may be set to be high (at block 1045). This means that WWAN cell search and measurements should only be made infrequently, as the BT link quality is considered to be poor. In this instance, k may be set to range from 9 to 12.

Once k is set, the method 1000 waits until the next PER averaging window (at block 1050) and then returns to measure the BT PER over a window (at block 1020). Thus, the adjustment of the WWAN cell search and measurement may be made as frequently as every BT PER averaging window.

In some examples, aspects from both methods 900, 1000 may be combined. It should be noted that the methods 900, 1000 are just example implementations, and that the operations of the methods 900, 1000 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communications, comprising:
   using a receive chain for both Bluetooth (BT) communications and wireless wide area network (WWAN) cell search and/or measurements;
   detecting a BT link quality for the BT communications that use the receive chain; and
   adjusting a periodicity of the WWAN cell search and/or measurements based at least in part on the BT link quality, wherein the WWAN cell search and/or measurements use the receive chain used for the BT communications, wherein the adjusting the periodicity of the WWAN search cell and/or measurements comprises increasing the periodicity of the WWAN cell search and/or measurements as the BT link quality decreases.

2. The method of claim 1, wherein the adjusting of the periodicity of the WWAN cell search and/or measurements further comprises:
   determining a type of the BT communications, parameters of the BT communications and a BT packet type used for the BT communications; and
   adjusting the periodicity of the WWAN cell search and/or measurements based on at least one of the BT link quality, the type of the BT communications, the parameters of the BT communications, and the BT packet type used for the BT communications.

3. The method of claim 1, wherein using the receive chain comprises:
   using the receive chain for BT communications that include enhanced voice (EV) packet type EV3, 2EV3 or 3EV3.

4. The method of claim 1, wherein using the receive chain comprises:
   using the receive chain for WWAN cell search and/or measurements on a frequency or radio access technology (RAT) that is different from a frequency or RAT used by a second receive chain.

5. The method of claim 1, wherein detecting the BT link quality comprises:
   determining a packet error rate (PER) for the BT communications.

6. The method of claim 5, wherein the adjusting of the periodicity of the WWAN cell search and/or measurements further comprises:
   increasing the periodicity of the WWAN cell search and/or measurements as the BT PER increases, the periodicity of the WWAN cell search and/or measurements having an upper limit based on the WWAN.

7. The method of claim 5, wherein the adjusting of the periodicity of the WWAN cell search and/or measurements further comprises:
   determining that the BT PER is in excess of one of a plurality of threshold PER limits; and
   setting the periodicity of the WWAN cell search and/or measurements based on the threshold PER limit exceeded by the BT PER.

8. The method of claim 5, wherein the adjusting of the periodicity of the WWAN cell search and/or measurements further comprises:
   setting the periodicity of the WWAN cell search and/or measurements in order to maintain a BT PER within a predetermined PER range.

9. The method of claim 5, wherein the determining the PER for the BT communications comprises:
   measuring the BT PER over a predetermined period of time.

10. The method of claim 1, wherein the adjusting of the periodicity of the WWAN cell search and/or measurements further comprises:
    using a scaling factor to adjust the periodicity of the WWAN cell search and/or measurements.

11. The method of claim 10, further comprising:
    selecting a lowest possible scaling factor in order to maintain a BT packet error rate within a predetermined range.

12. The method of claim 1, further comprising:
    aligning a timing of the WWAN cell search and/or measurements and BT communication so that a minimum number of BT communication intervals are affected by the WWAN cell search and/or measurements.

13. An apparatus for wireless communication, comprising:
    means for using a receive chain for both Bluetooth (BT) communications and wireless wide area network (WWAN) cell search and/or measurements;
    means for detecting a BT link quality for the BT communications that use the receive chain; and
    means for adjusting a periodicity of the WWAN cell search and/or measurements based at least in part on the BT link quality, wherein the WWAN cell search and/or measurements use the receive chain used for the BT communications, wherein the means for adjusting the periodicity of the WWAN search cell and/or measurements comprises means for increasing the periodicity of the WWAN cell search and/or measurements as the BT link quality decreases.

14. The apparatus of claim 13, wherein the means for adjusting of the periodicity of the WWAN cell search and/or measurements further comprises:
    means for determining a type of the BT communications, parameters of the BT communications and a BT packet type used for the BT communications; and
    means for adjusting the periodicity of the WWAN cell search and/or measurements based on at least one of the BT link quality, the type of the BT communications, the parameters of the BT communications, and the BT packet type used for the BT communications.

15. The apparatus of claim 13, wherein the means for using the receive chain comprises:
    means for using the receive chain for BT communications that include enhanced voice (EV) packet type EV3, 2EV3 or 3EV3.

16. The apparatus of claim 13, wherein the means for using the receive chain comprises:
    means for using the receive chain for WWAN cell search and/or measurements on a frequency or radio access technology (RAT) that is different from a frequency or RAT used by a second receive chain.

17. The apparatus of claim 13, wherein the means for detecting the BT link quality comprises:
    means for determining a packet error rate (PER) for the BT communications.

18. The apparatus of claim 17, wherein the means for adjusting of the periodicity of the WWAN cell search and/or measurements further comprises:
    means for increasing the periodicity of the WWAN cell search and/or measurements as the BT PER increases, the periodicity of the WWAN cell search and/or measurements having an upper limit based on the WWAN.

19. The apparatus of claim 17, wherein the means for adjusting of the periodicity of the WWAN cell search and/or measurements further comprises:
 means for determining that the BT PER is in excess of one of a plurality of threshold PER limits; and
 means for setting the periodicity of the WWAN cell search and/or measurements based on the threshold PER limit exceeded by the BT PER.

20. The apparatus of claim 17, wherein the means for adjusting of the periodicity of the WWAN cell search and/or measurements further comprises:
 means for setting the periodicity of the WWAN cell search and/or measurements in order to maintain a BT PER within a predetermined PER range.

21. The apparatus of claim 17, wherein the means for determining the PER for the BT communications comprises:
 means for measuring the BT PER over a predetermined period of time.

22. The apparatus of claim 13, wherein the means for adjusting of the periodicity of the WWAN cell search and/or measurements further comprises:
 means for using a scaling factor to adjust the periodicity of the WWAN cell search and/or measurements.

23. The apparatus of claim 22, further comprising:
 means for selecting a lowest possible scaling factor in order to maintain a BT packet error rate within a predetermined range.

24. The apparatus of claim 13, further comprising:
 means for aligning a timing of the WWAN cell search and/or measurements and BT communication so that a minimum number of BT communication intervals are affected by the WWAN cell search and/or measurements.

25. An apparatus for wireless communication, comprising:
 a processor;
 memory in electronic communication with the processor; and
 instructions stored in the memory, the instructions being executable by the processor to:
  use a receive chain for both Bluetooth (BT) communications and wireless wide area network (WWAN) cell search and/or measurements;
  detect a BT link quality for the BT communications that use the receive chain; and
  adjust a periodicity of the WWAN cell search and/or measurements based at least in part on the BT link quality, wherein the WWAN cell search and/or measurements use the receive chain used for the BT communications, wherein the instructions for adjusting the periodicity of the WWAN search cell and/or measurements include instructions executable by the processor to increase the periodicity of the WWAN cell search and/or measurements as the BT link quality decreases.

26. The apparatus of claim 25, wherein the instructions for adjusting of the periodicity of the WWAN cell search and/or measurements further include instructions executable by the processor to:
 determine a type of the BT communications, parameters of the BT communications and a BT packet type used for the BT communications; and
 adjust the periodicity of the WWAN cell search and/or measurements based on at least one of the BT link quality, the type of the BT communications, the parameters of the BT communications, and the BT packet type used for the BT communications.

27. The apparatus of claim 25, wherein the instructions for detecting the BT link quality include instructions executable by the processor to:
 determine a packet error rate (PER) for the BT communications.

28. The apparatus of claim 25, wherein the instructions for adjusting of the periodicity of the WWAN cell search and/or measurements further include instructions executable by the processor to:
 use a scaling factor to adjust the frequency of the WWAN cell search and/or measurements.

29. A non-transitory computer-readable medium storing computer-executable code for wireless communication, the code executable by a processor to:
 use a receive chain for both Bluetooth (BT) communications and wireless wide area network (WWAN) cell search and/or measurements;
 detect a BT link quality for the BT communications that use the receive chain; and
 adjust a periodicity of the WWAN cell search and/or measurements based at least in part on the BT link quality, wherein the WWAN cell search and/or measurements use the receive chain used for the BT communications, wherein the code for adjusting the periodicity of the WWAN search cell and/or measurements includes code executable by the processor to increase the periodicity of the WWAN cell search and/or measurements as the BT link quality decreases.

30. The computer-readable medium of claim 29, wherein the code for adjusting of the periodicity of the WWAN cell search and/or measurements further includes code executable by the processor to:
 determine a type of the BT communications, parameters of the BT communications and a BT packet type used for the BT communications; and
 adjust the periodicity of the WWAN cell search and/or measurements based on at least one of the BT link quality, the type of the BT communications, the parameters of the BT communications, and the BT packet type used for the BT communications.

* * * * *